US009064165B2

(12) United States Patent
Havens et al.

(10) Patent No.: US 9,064,165 B2
(45) Date of Patent: Jun. 23, 2015

(54) LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS

(75) Inventors: William Havens, Syracuse, NY (US); Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/432,197

(22) Filed: Mar. 28, 2012

(65) Prior Publication Data

US 2013/0256418 A1 Oct. 3, 2013

(51) Int. Cl.
*G06K 7/10* (2006.01)

(52) U.S. Cl.
CPC .......... *G06K 7/10831* (2013.01); *G06K 7/1096* (2013.01)

(58) Field of Classification Search
USPC ........... 235/383, 462.33, 454, 462.4; 348/234
See application file for complete search history.

(56) References Cited

U.S. PATENT DOCUMENTS

| 5,359,185 | A | 10/1994 | Hanson |
|---|---|---|---|
| 6,097,856 | A | 8/2000 | Hammond, Jr. |
| 6,213,399 | B1 * | 4/2001 | Tsi et al. ................. 235/462.08 |
| 6,547,139 | B1 | 4/2003 | Havens et al. |
| 6,854,649 | B2 | 2/2005 | Worner et al. |
| 6,969,003 | B2 | 11/2005 | Havens et al. |
| 7,224,540 | B2 | 5/2007 | Olmstead et al. |
| 2003/0189097 | A1 * | 10/2003 | Li ................................ 235/454 |
| 2006/0180670 | A1 * | 8/2006 | Acosta et al. ............ 235/462.31 |
| 2006/0249584 | A1 * | 11/2006 | Bobba et al. ............. 235/462.39 |
| 2007/0276187 | A1 * | 11/2007 | Wiklof et al. ................. 600/182 |
| 2008/0142596 | A1 * | 6/2008 | Knowles et al. ........... 235/462.1 |
| 2009/0168117 | A1 | 7/2009 | Kearney |
| 2011/0084143 | A1 * | 4/2011 | Liou ......................... 235/462.42 |
| 2011/0127697 | A1 * | 6/2011 | Milne .......................... 264/400 |
| 2012/0069219 | A1 * | 3/2012 | Ono ............................. 348/234 |

\* cited by examiner

*Primary Examiner* — Thien M Le
*Assistant Examiner* — Asifa Habib
(74) *Attorney, Agent, or Firm* — Additon, Higgins & Pendleton, P.A.

(57) ABSTRACT

A laser scanning bar code symbol reading system having a scanning window, from which blue/red beam-waist-extended laser scanning planes are projected and intersect within an extended depth of field (DOF) defined adjacent the scanning window. In the illustrative embodiment, the laser scanning bar code symbol reading system includes a laser scanning subsystem having: a dual laser sources for producing a laser beams having blue and red spectral components; a collimating lens for collimating the laser beams; an aperture stop for shaping the cross-sectional dimensions of the collimated the laser beams; and beam-waist extending optics (e.g. axiconlens) for extending the waist of the laser beam having a red characteristic wavelength.

13 Claims, 9 Drawing Sheets

LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS

BACKGROUND OF DISCLOSURE

1. Field of Disclosure

The present disclosure relates generally to improvements in reading bar code symbols in point-of-sale (POS) environments in ways which increase flexibility and POS throughput.

2. Brief Description of the State of Knowledge in the Art

In modern self-service POS-stations, customers often checkout their own product purchases without the assistance of a cashier. In such application environments, bi-optical and flat-bed type laser scanning systems are often deployed to facilitate the scanning of bar code symbols on both small and large products being purchased at the POS checkout station.

Typically, self-checkout systems employ flat-bed type laser scanning systems, or more robust "bi-optical" laser scanning systems. Flat-bed laser scanning systems employ a single set of optics disposed behind a single scanning window. Bi-optical laser scanning systems employ two sets of optics disposed behind the bottom and side-scanning windows thereof. Examples of polygon-based bi-optical laser scanning systems are disclosed in U.S. Pat. Nos. 4,229,588; 4,652,732 and 6,814,292; each incorporated herein by reference in its entirety.

Commercial examples of bi-optical laser scanners include: the PSC 8500—6-sided laser based scanning by PSC Inc.; PSC 8100/8200, 5-sided laser based scanning by PSC Inc.; the NCR 7876—6-sided laser based scanning by NCR; the NCR7872, 5-sided laser based scanning by NCR; and the MS232x Stratos®H, and MS2122 Stratos® E Stratos 6 sided laser based scanning systems by Metrologic Instruments, Inc., and the MS2200 Stratos®S 5-sided laser based scanning system by Metrologic Instruments, Inc.

While conventional flat-bed and bi-optical laser scanning systems allow the omni-directional reading of bar code symbols transported past the scanning windows of such POS-based checkout systems, the scanning coverage allowed by such conventional systems is currently much smaller than would be otherwise desired to increase the speed and throughput of conventional self-checkout systems.

Thus, despite the many improvements in the laser scanning bar code symbol readers over the years, there is still a great need in the art for an improved laser scanning bar code symbol reading system, while avoiding the shortcomings and drawbacks of prior art systems and methodologies.

OBJECTS AND SUMMARY

Accordingly, a primary object of the present disclosure is to provide an improved bar code symbol reading system which is capable of extended depth-of-field operation in demanding POS scanning environments, which is free of the shortcomings and drawbacks of prior art systems and methodologies.

Another object is to provide an improved bar code symbol reading system having a housing section with a scanning window, wherein a laser scanning subsystem generates and projects composite red and blue laser scanning planes within a 3D scanning volume defined relative to the scanning window, so as to effectively extend the depth of field (DOF) boundaries of its 3D scanning volume, while maintaining the capacity to resolve high-resolution bar code symbols having minimum (e.g. 5 mil) code element widths, where 1 mil=0.001 inch.

Another object is to provide an improved bi-optical bar code symbol reading system having a vertical housing section with a vertical scanning window, and a horizontal housing section with a horizontal scanning window adjacent the vertical scanning window, wherein a laser scanning subsystem generates and projects composite (red and blue) laser scanning planes within a 3D scanning volume defined between the vertical and horizontal scanning windows of the system, so as to effectively extend the depth of field (DOF) boundaries of its 3D scanning volume.

Another object is to provide an improved bi-optical bar code symbol reading system, wherein the laser scanning subsystems deployed within the horizontal and vertical sections, each generate and project red and blue laser scanning planes within the 3D scanning volume of the system to improve its depth of focus.

Another object is to provide a laser scanning bar code symbol reading system employing a laser scanning subsystem comprising: a red wavelength laser source for producing a laser beam having long wavelength components in the red color range; a collimating lens for collimating the red laser beam; an aperture stop for shaping the cross-sectional dimensions of the collimated red laser beam; and a beam-waist extending optics for controllably extending the beam waist of the red laser beam, as the laser scanning beam is scanned across a depth-of-field (DOF) extended 3D scanning volume.

Another object is to provide a laser scanning bar code symbol reading system employing a laser scanning subsystem comprising: a blue wavelength laser source for producing a blue laser beam having short wavelengths in the blue color range; a collimating lens for collimating the blue laser beam; an aperture stop for shaping the cross-sectional dimensions of the collimated blue laser beam.

Another object is to provide an improved bar code symbol reading system having a housing section with a scanning window, wherein a laser scanning subsystem generates and projects composite red and blue laser scanning planes within a scanning field defined relative to the scanning window, so as to effectively extend the depth of field (DOF) of the system, while maintaining the capacity to resolve high-resolution bar code symbols having minimum code element widths (e.g. 5 mils).

Another object is to provide a retro-reflective type laser scanning system employing red and blue laser beam sources, and beam-waist extending optics to extend the beam waist of the red laser beam during laser scanning operations.

Another object is to provide a non-retro-reflective type laser scanning system employing red and blue laser beam sources, and beam-waist extending optics to extend the beam waist of the red laser beam during laser scanning operations.

Another object is to provide a DOF-extended laser scanning bar code symbol reading system that helps improve worker productivity, checkout speed and throughput.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which.

DETAILED DESCRIPTION OF THE ILLUSTRATIVE EMBODIMENT

Figure 1:
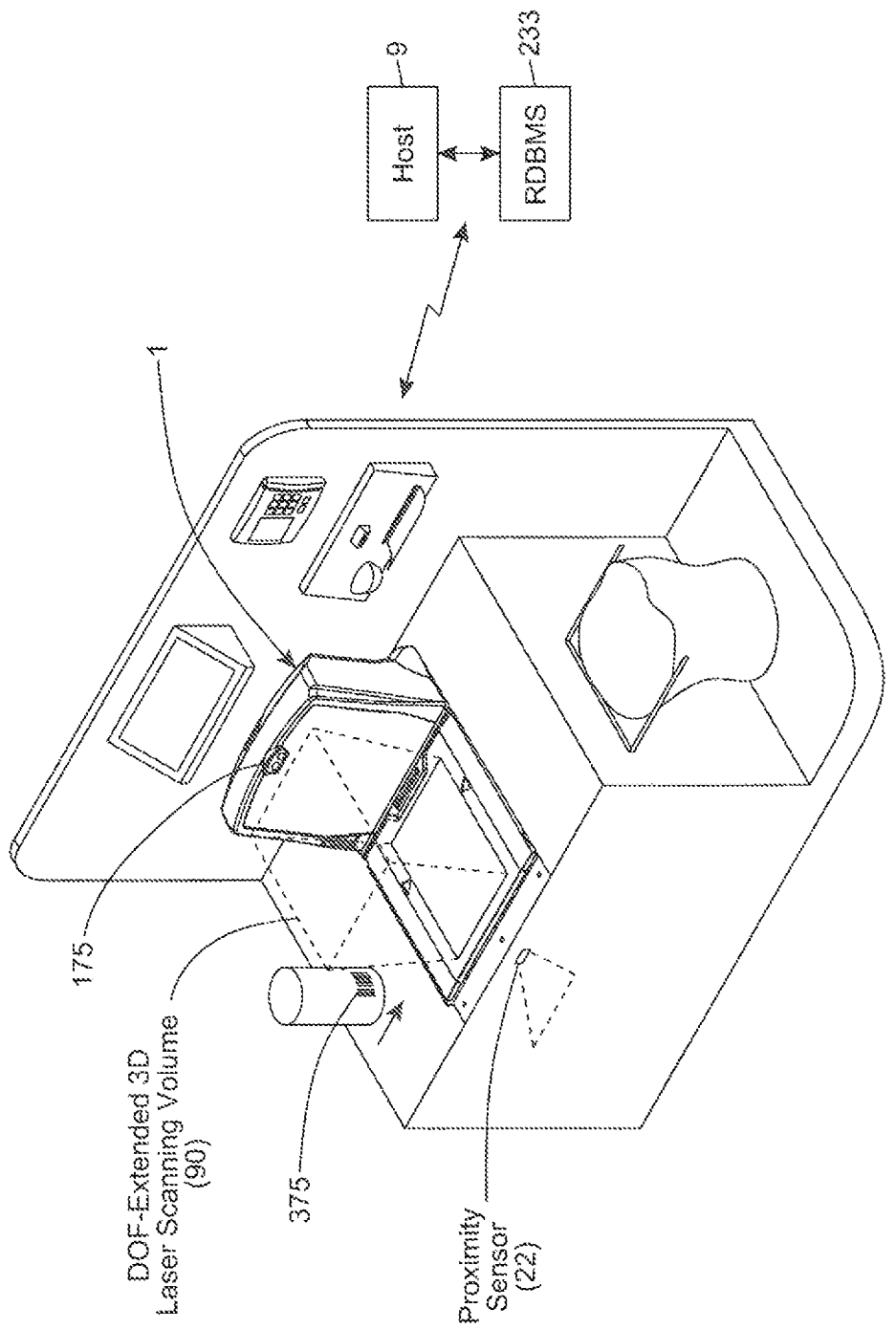
FIG. 1 is a perspective view of an illustrative embodiment of a point of sale (POS) checkout station installation, employing a bi-optical bar code symbol reading system supporting extended depth of field operation.

Referring to the figures in the accompanying Drawings, the various illustrative embodiments of the apparatus and methodologies will be described in great detail, wherein like elements will be indicated using like reference numerals.

Specification of the Bi-Optical Laser Scanning Code Symbol Reading System of the Present Disclosure FIGS. 1 through 5 show an illustrative embodiment of the bi-optical laser-scanning bar code symbol reading system 1 of the present disclosure supporting at least two different modes of operation, namely: (i) a sleep mode of operation; and (ii) a laser scanning mode of operation.

Figure 2A:
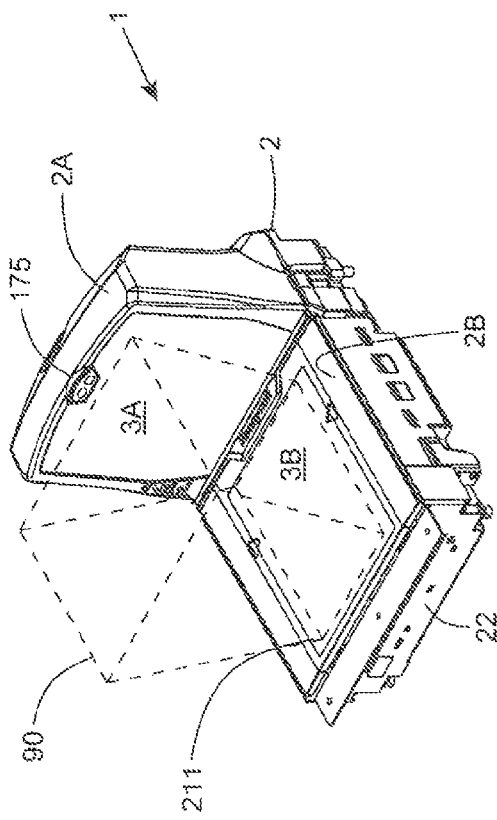
FIG. 2A is a first perspective view of the bi-optical bar code symbol reading system shown in FIG. 1, shown removed from the POS checkout station.
Figure 2C:
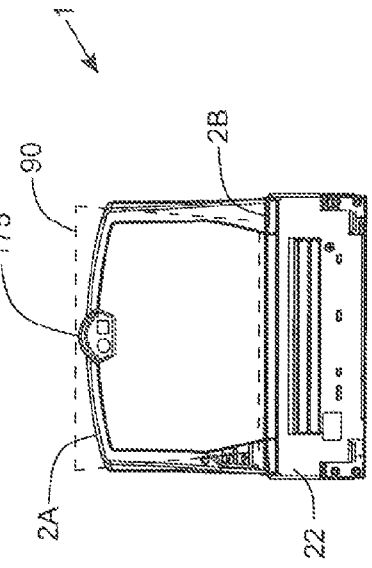
FIG. 2C is an elevated end view of the bi-optical bar code symbol reading system of FIG. 2A.
Figure 2B:
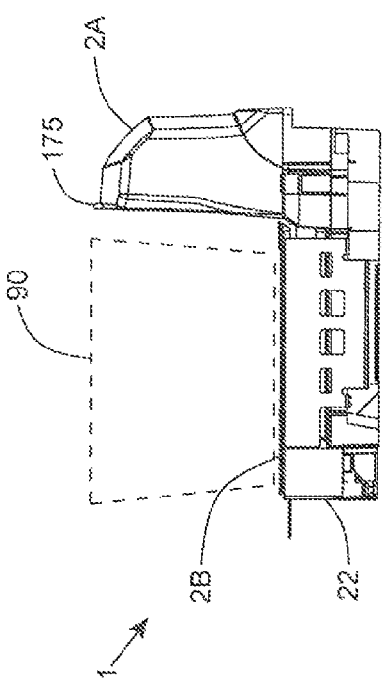
FIG. 2B is a side cross-sectional side view of the bi-optical bar code symbol reading system of FIG. 2A.

As shown in FIGS. 2A, 2B and 2C, the bar code symbol reading system of the illustrative embodiment includes: a system housing 2 having a vertical housing section 2A with a vertical optically transparent (glass) scanning window 3A; and a horizontal housing section 2B with a horizontal optically transparent (glass) scanning window 3B. Typically, the system housing is installed at a retail point of sale (POS) checkout station, well known in the art. The retail POS station will have a countertop surface, and oftentimes a conveyor belt for moving products towards the bar code symbol reading system. As shown in FIG. 1, the bar code symbol reading system 1 will be interfaced to a host computer system 9 that is connected to the retail LAN and/or WAN, on which one or more product price database systems (RDBMS) will be deployed.

Figure 2D:
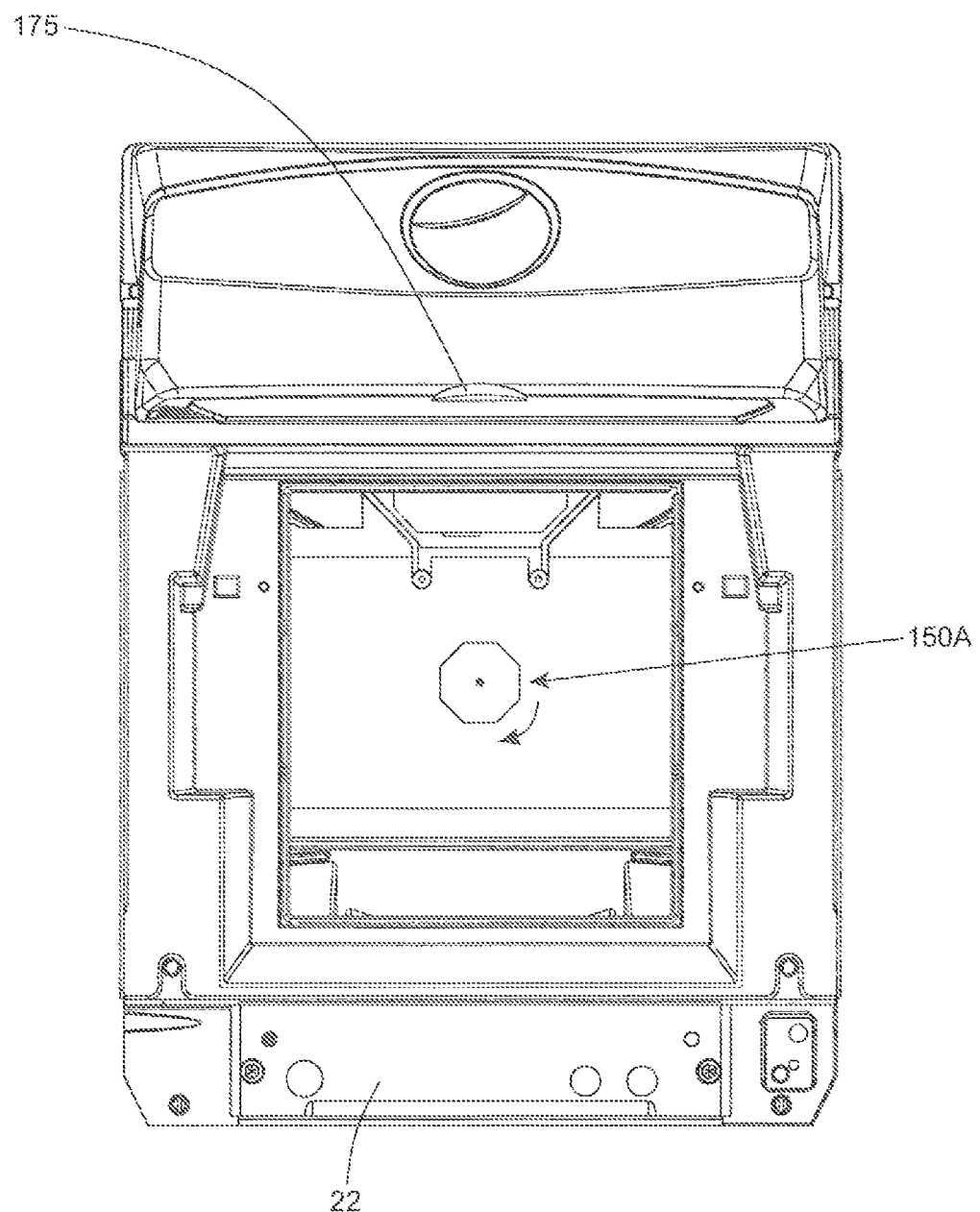
FIG. 2D is a plan view of the bi-optical bar code symbol reading system of FIG. 1A.
Figure 3:
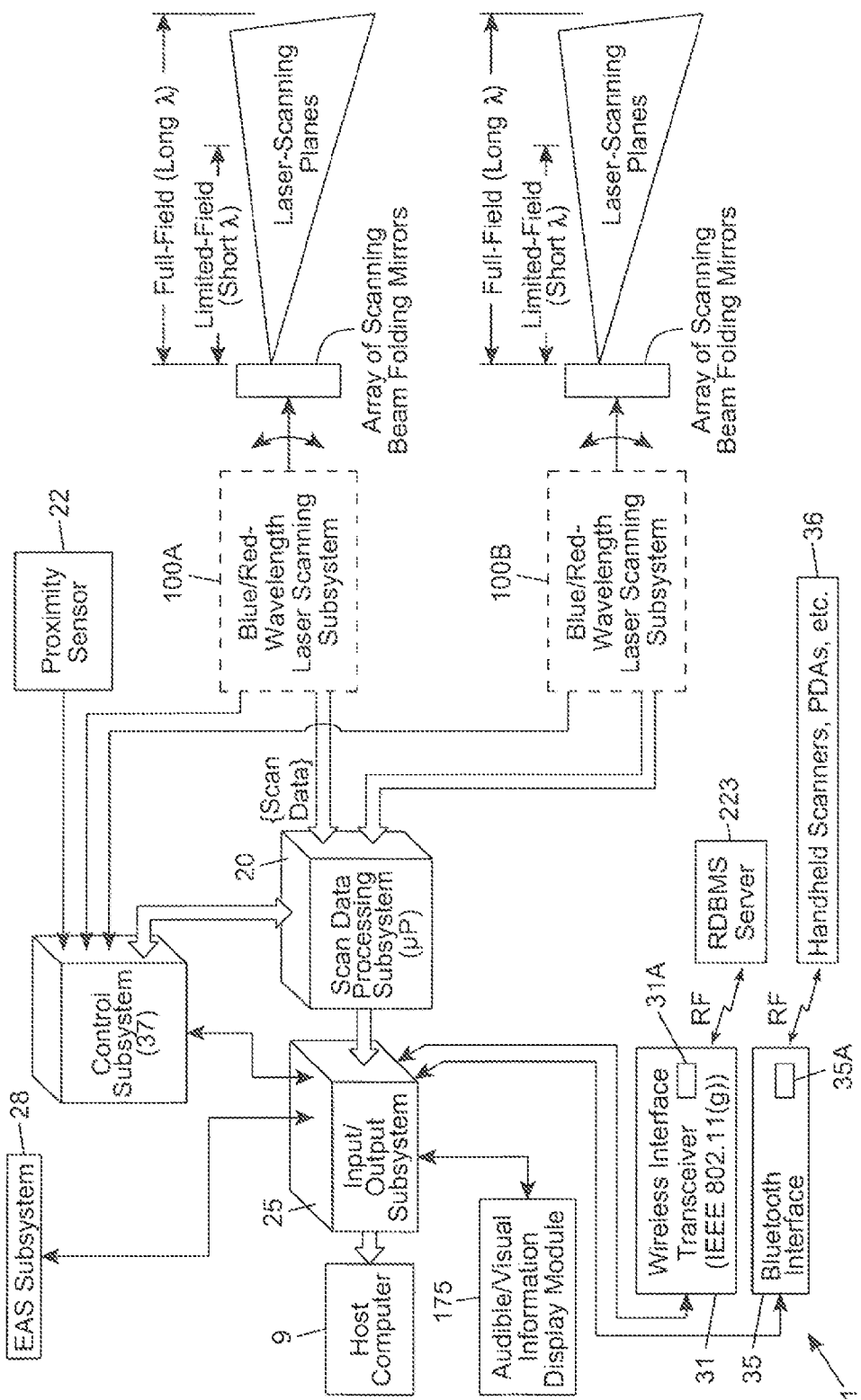
FIG. 3 is a block schematic representation of the scanning code symbol reading system of FIGS. 1A through 1C, wherein a pair of blue/red wavelength laser scanning subsystems support the generation of a beam-waist extended red laser beam for scanning bar-coded objects (e.g. with UPC symbols) located within the full-field portion of each generated laser scanning plane, and a blue laser beam for scanning coded objects located within the limited-field portion of each generated laser scanning plane.
Figure 4:
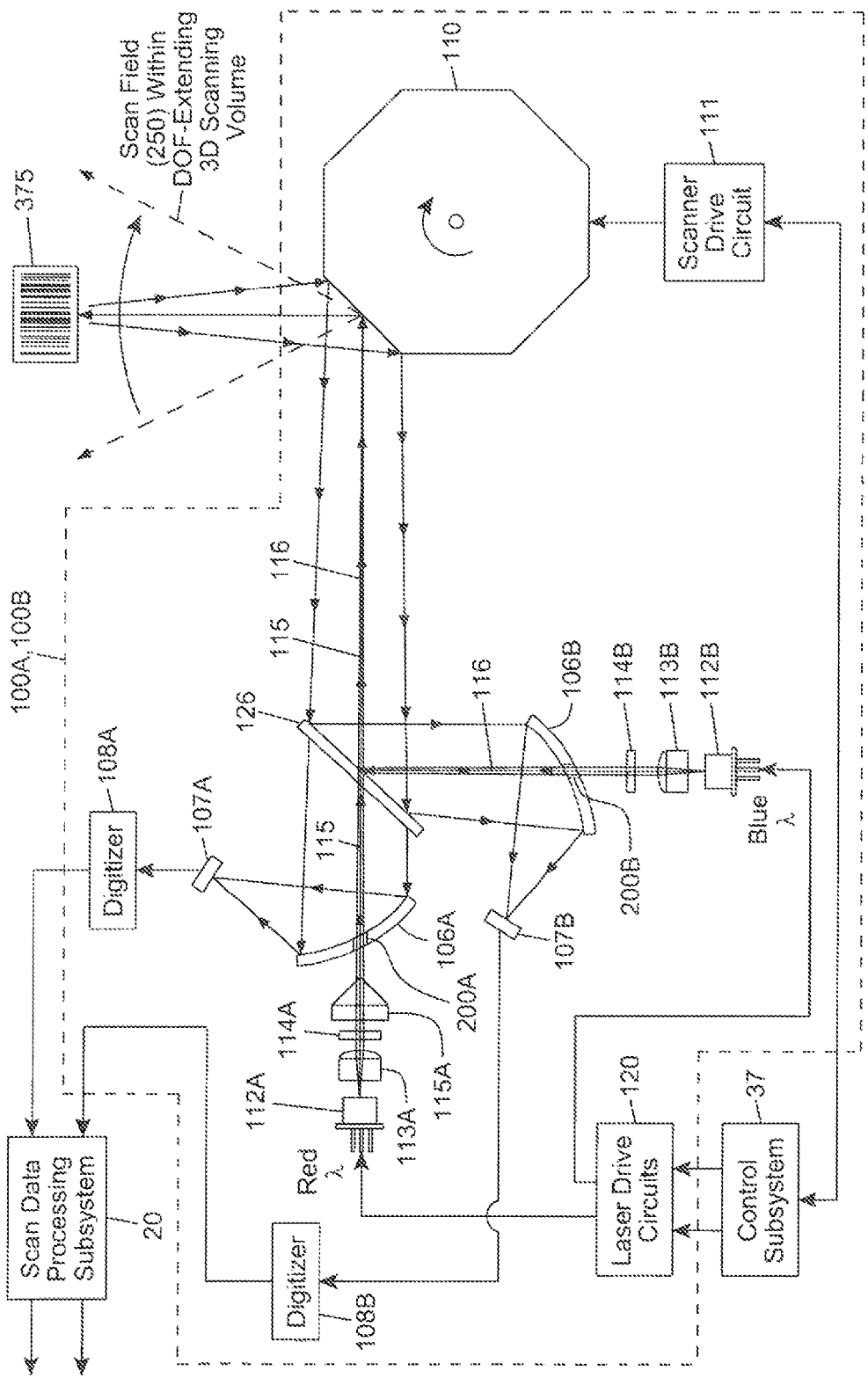
FIG. 4 is a block schematic representation of the dual-wavelength laser scanning subsystem supported within the bi-optical bar code symbol reading system of FIGS. 1A through 1C.

As shown in FIGS. 2A, 2B, 2C and 2D, the horizontal and vertical sections 2A and 2B of the system housing are arranged in an orthogonal relationship with respect to each other such that the horizontal and vertical scanning windows are substantially perpendicular. As shown in FIGS. 3 and 4, a pair of retro-reflective type laser scanning stations 100A and 100B are mounted within the system housing, for the purpose of generating and projecting complex groups of laser scanning planes through laser scanning windows 3A and 3B. These laser scanning planes intersect and produce an omni-directional laser scanning pattern within a 3D scanning volume 90, defined between the vertical and horizontal scanning windows 3A and 3B. In the illustrative embodiment, each laser scanning plane has a full-field region within the 3D scanning volume (e.g. capable of scanning UPC symbols from 1-15"), and a limited-field region within the 3D scanning volume (e.g. capable of scanning 5 mil. bar code symbols over this limited range).

As shown in FIG. 3, POS-based checkout system 1 generally comprises: retro-reflective laser scanning stations 100A and 100B for generating and projecting groups of laser scanning planes through the vertical and horizontal scanning windows 3A and 3B, respectively, and generating scan data streams from scanning objects in the 3D scanning volume 90; a scan data processing subsystem (i.e. scan data processor) 20 for supporting automatic scan data processing based bar code symbol reading using scan data streams generated from stations 100A and 100B; an input/output subsystem 25 for interfacing with scan data processing subsystem 20, system control subsystem 37, Electronic Article Surveillance (EAS) Subsystem 28 including a Sensormatic® EAS tag deactivation block integrated in system, and an audible/visual information display subsystem (i.e. module) 175, and supporting universal, standard and/or proprietary data communication interfaces with host system 9 and other external devices; a BlueTooth® RF 2-way communication interface 35 including RF transceivers and antennas for connecting to Bluetooth® enabled hand-held scanners, imagers, PDAs, portable computers 36 and the like, for control, management, application and diagnostic purposes; a control subsystem 37 for controlling (i.e. orchestrating and managing) the operation of the laser scanning stations (i.e. subsystems) 100A, 100B, other subsystems supported in the system; and IR-based wake-up detector 22, operably connected to the control subsystem 37, for generating and supplying a first trigger signal to the system controller in response to automatic detection of an operator in proximity (e.g. 1-2 feet) of the system housing.

In the illustrative embodiment, each retro-reflective laser scanning station 100A, 100B is constructed from a rotating polygon, a laser diode source (e.g. VLD), with beam forming optics, light collection optics, a photodiode, and other optical components, which will be described more fully herein.

In the illustrative embodiment, the IR-based proximity detector 22 is mounted in the front portion of the housing for automatically detecting the presence of a human operator in front of the 3D scanning volume during system operation. The function of the IR-based proximity detector is to wake up the system (i.e. WAKE UP MODE), and cause a Sleep Timer to be set to count how long the system has to read a bar code symbol (e.g. 15 minutes) before the system is automatically induced into its SLEEP MODE, where the polygon scanning element and laser diodes are deactivated to conserve electrical power within the system. Preferably, the IR-based proximity (i.e. wake-up) detector 22 is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

In the illustrative embodiment, each generated laser scanning plane has a full-field region, and a limited-field region, within the 3D scanning volume. As shown in FIG. 4, each laser scanning station 100A (100B) comprises: a red laser source 112A for generating a red laser beam (i.e. laser beam having a long characteristic wavelength in the red spectral range) having a beam waist extending over the full-field region of each laser scanning plane generated from the red laser beam; a collimating lens 113A for collimating light rays produced from source 112A; an aperture stop 114A with an aperture which may have one of a number of biaxial shapes such as square, rectangular, circular, oblong, or elliptical for shaping the cross-sectional dimensions of the collimated laser beam from laser source 112A; beam-waist extending optics 115A for controllably extending the beam waist of the red laser beam over the full-field region of the laser scanning plane generated from the red laser beam (e.g. a cubic phase mask (e.g. U.S. Pat. No. 6,969,003), a phase modulation plate or phase filter (e.g. U.S. Pat. No. 7,569,981), an axicon lens or a rotationally symmetric prism (e.g. U.S. Pat. No. 5,080,456), a multi-focal lens (U.S. Pat. No. 7,554,750), a linear or augmented axicon lens (e.g. U.S. Pat. No. 5,331,143), a Mathieu or Mathieu-Gaussian filter (U.S. Pat. No. 6,719,204), an asymmetrical optical element (e.g. U.S. Pat. No. 7,063,261 or 7,224,538), an optical assembly using an apodization element and a negative bi-prism (e.g. copending U.S. application Ser. No. 13/233,332 incorporated herein by reference), a conical lens, or other functionally equivalent device, incorporated herein by reference; a blue laser source 112B for generating a blue laser beam (i.e. laser beam having a short characteristic wavelength in the blue spectral range) having a beam waist extending over the limited-field region of each laser scanning plane generated from the blue laser beam; a collimating lens 113B for collimating light rays produced from source 112B; an aperture stop which may have one of a number of biaxial shapes such as square, rectangular, circular, oblong, or elliptical 114B for shaping the cross-sectional dimensions of the collimated laser beam from laser source 112B; a wavelength-dependent light transmission filter (i.e. dichroic filter) 126 for transmitting red wavelengths produced from the red laser source 112A, and reflecting blue wavelengths produced from the blue laser source 112B, and serving the function of optically combining the red and blue laser beams into a single composite laser beam having red and blue spectral components with a characteristic red light component and a characteristic blue light component; a first light collecting mirror 106A having a first central aperture 200A for transmitting the red laser beam from beam-waist extending optics 112A to the wavelength-dependent light transmission filter 126, for collecting light reflected/scattered from scanned object in the scanning field; a first photo-detector 107A for detecting the intensity of collected red laser light and generating an analog scan data signal corresponding to the detected light intensity during scanning operations; a first digitizer 108A for digitizing analog scan data signals from photo-detector 107A, and producing corresponding digital scan signals (i.e. digital count values); a second light collecting mirror 106B having a second central aperture 200B for transmitting the blue laser beam from source 112B to the wavelength-dependent light transmission filter 126, for collecting light reflected/scattered from scanned object in the scanning field; a second photo-detector 107B for detecting the intensity of collected blue laser light and generating an analog scan data signal corresponding to the detected light intensity during scanning operations; a second digitizer 108B for digitizing analog scan data signals from photo-detector 107B, and producing corresponding digital scan signals (i.e. digital count values); and a scan data processing subsystem 20 for decode processing digitized data signals from modules 108A and 108B, and generating symbol character data representative of each bar code symbol scanned by the composite laser scanning beam 115, 116 within the 3D scanning volume 90.

As shown in FIG. 4, each laser scanning subsystem 100 further comprises: a scanning assembly 110 having an electric motor for rotating, at high angular velocities, a scanning element (e.g. polygon structure with a plurality of mirror elements arranged at different angles relative to the axis of rotation); a scanner drive circuit 111 for generating electrical drive signals to drive the polygon motor 110; and laser drive circuits 120 for driving the laser beam sources 112A and 112B with laser drive signals as shown.

As shown in FIGS. 3 and 4, the composite red and blue laser beam is directed towards rotating polygon 110, which sweeps the deflected composite laser beam off an array of stationary laser beam folding mirrors, disposed about the rotating polygon 110, to generate a plurality of composite (red and blue) laser scanning planes which are projected through the vertical and horizontal scanning windows, and intersect within the 3D scanning volume 90 to form a complex laser scanning pattern therewithin, for omni-directional scanning of bar-coded objects that are present therein.

Specification of the Beam-Waist Extending Laser Beam Production Module Employed in the Bi-Optical System of the Present Disclosure In the laser scanning system of the present disclosure, the laser beam waist length and speckle noise are improved by utilizing a blue laser diode, in combination with a traditional red laser diode. This combination of spectral components (i.e. optical wavelengths) in the laser scanning beam helps overcome the potential disadvantage that might arise from a blue laser beam attempting to optically scan and read a small subset of bar codes because the bar code printing specification requires that the bar code dark elements absorb energy in the red portion of the spectrum, as well as read high-density and low density bar codes in a given application.

It can be shown that the beam depth of field (DOF) for a Gaussian laser beam is given as:

$DOF = 2\pi W_o / \lambda$ where Wo is the minimum waist diameter of the laser beam, and $\lambda$ is the wavelength of the laser beam. Thus as the wavelength $\lambda$ of the laser beam decreases, its depth of field (DOF), for a given minimum beam diameter, increases.

For example if a red laser has a wavelength $\lambda$ of 635 nm and a blue laser has a wavelength $\lambda$ of 445 nm, then the scanning depth of field (DOF) for the combined laser beam, having a given minimum spot diameter, will increase by approximately 40%, assuming that sampling, signal level and scan width limitations are not exceeded.

The maximum spatial frequency of speckle noise at the minimum laser beam spot diameter can be shown to behave as:

$Freq = D/(Z^*\lambda)$ where D is the diameter of spot, Z is the distance to the spot, and $\lambda$ is the wavelength of the light source.

Thus as the wavelength λ becomes shorter, the maximum spatial frequency of the speckle noise increases, with the result that the variation in the spot intensity for a given scan spot size should decrease. In addition, the human eye is less sensitive to blue laser light, than red laser light, resulting in a blue laser source appearing less disturbing than red laser light, to users and customers present in the vicinity of a laser scanning system. For example if a red laser has a wavelength of 635 nm and a blue laser has a wavelength of 445 nm, and each laser source has the same power, then a blue laser spot produced by the blue laser source will appear approximately ⅙ as bright as a red laser spot produced by a red laser source. See the reference "Optoelectronics: Theory and Practice," published by Texas Instrument (TI) Institute Electrical Series, McGraw-Hill, incorporated herein by reference. Based upon the above, with the application of a shorter wavelength blue laser diode, the scanning attributes are further enhanced.

The operational depth of field (DOF) of the bi-optical laser scanning bar code symbol reading system of the present disclosure is significantly increased by employing the beam-waist extending optics 115A to extend the beam waist of the red wavelength laser beam produced from source 112A, as described above. The beam-waist extending optics 115A has the effect of extending the beam waist (and thus depth of field DOF) of the blue/red composite laser beam over an extended range, required in the application of the present disclosure. Preferably, the beam-waist extending optics 115A is designed to fit into the laser beam shaping optical module, specified in FIG. 4. Most conveniently, this optical device would be a molded optical element. Alternatively, the beam-waist extending optics 115A could be added to one of the optical surfaces of the existing beam shaping optics 114A. Most conveniently this would be a molded optical element, as well.

The focusing or collimating lens 113A can be optimized in order to adjust the minimum waist diameter for a maximum depth of field (DOF) for the specific application at hand.

Control Operations within the Bi-Optical Laser Scanning Bar Code Reading System Referring to FIG. 5, the method of reading bar code symbols and controlling operations within the bar code reader will be described in greater detail.

Figure 5:
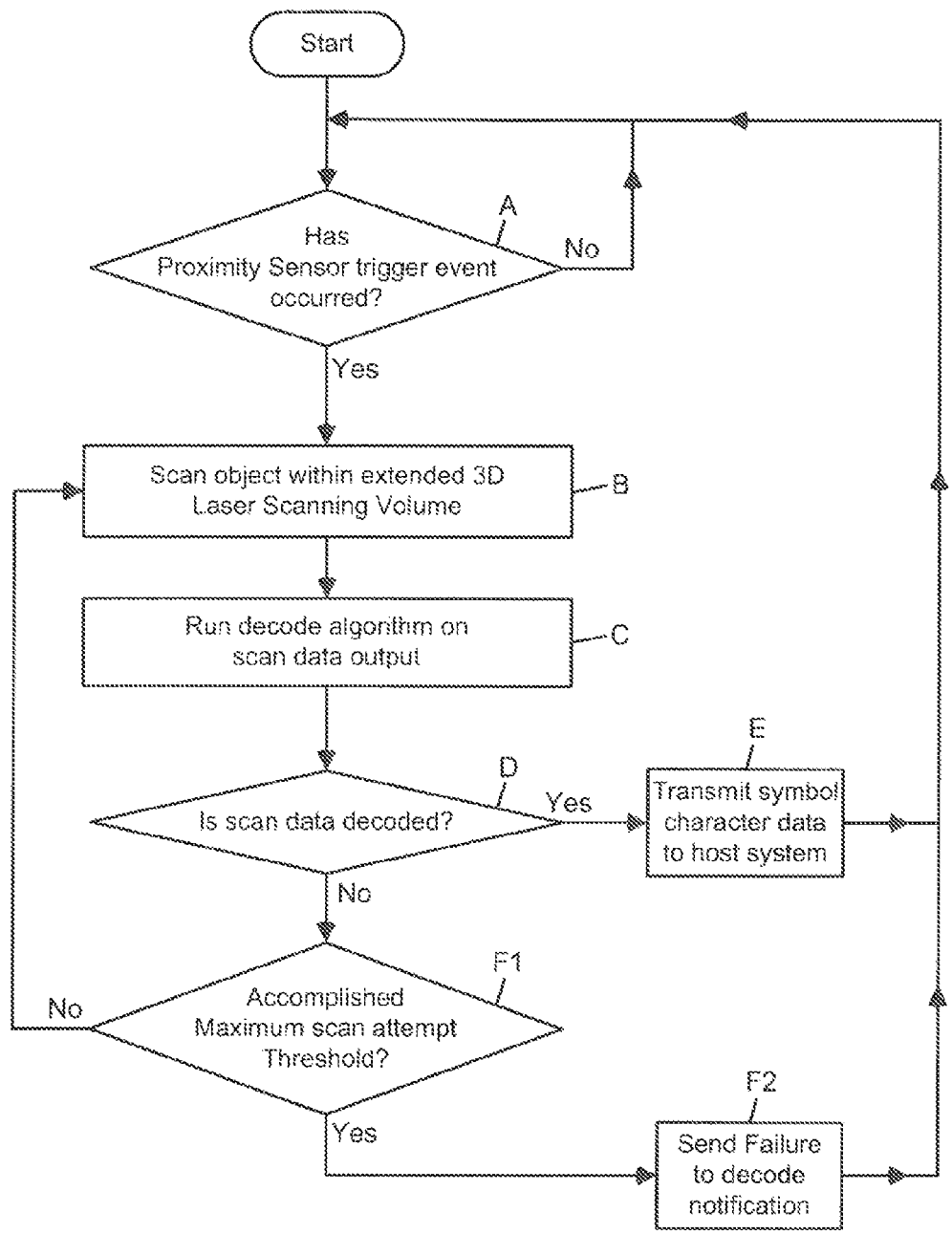
FIG. 5 is a flow chart describing the control process supported by the system controller within the bi-optical bar code symbol reading system of the illustrative embodiment, during its operation.

As indicated in FIG. 5, the process orchestrated by system controller 37 begins at the START Block. Then at Block A, the system controller 37 determines if the proximity detector has produced a trigger event upon detecting the presence of an operator before the system housing. If no trigger event is detected at Block A, the system controller 37 remains at Block A until the wake up event occurs. If a trigger event is detected at Block A, then at Block B, the system controller wakes up the system, including the blue/red-wavelength laser scanning stations 100A and 100B, and then scans any object within the extended depth of field (DOF) 3D laser scanning volume, using the blue/red-wavelength beam-waist-extended laser sources provided with each laser scanning station 100A, 100B.

At Block C, the decode processor 20 runs a decode algorithm on the captured scan data. If at Block D, a bar code symbol is decoded, then at Block E, the produced symbol character data is transmitted to the host system, and the system controller returns to Block A.

If, however, at Block D a bar code symbol is not decoded, then the system controller 37 determines at Block F1 whether or not the maximum scan attempt threshold has been reached, and if not, then the system controller 37 returns to Block B, and resumes the flow as indicated. However, if at Block F1, the system controller 37 determines that the maximum scan attempt threshold has been accomplished, then the system controller 37 proceeds to Block F2 and sends a Failure to Decode notification to the operator and returns to Block A. Other operational processes are also known in the art.

Specification of the Hand-Supportable Laser Scanning System of the Present Disclosure Referring to FIGS. 6 through 8B, a second illustrative embodiment of a hand-supportable non-retro-reflective type of laser scanning bar code symbol reading system 300 will be described in detail. It is understood, however, such a non-retro-reflective scanning apparatus of the present disclosure can be realized in any POS-based system, including systems having the form factor shown in FIGS. 1 through 2D, and thus need not be realized in hand-held systems and devices.

Figure 6:
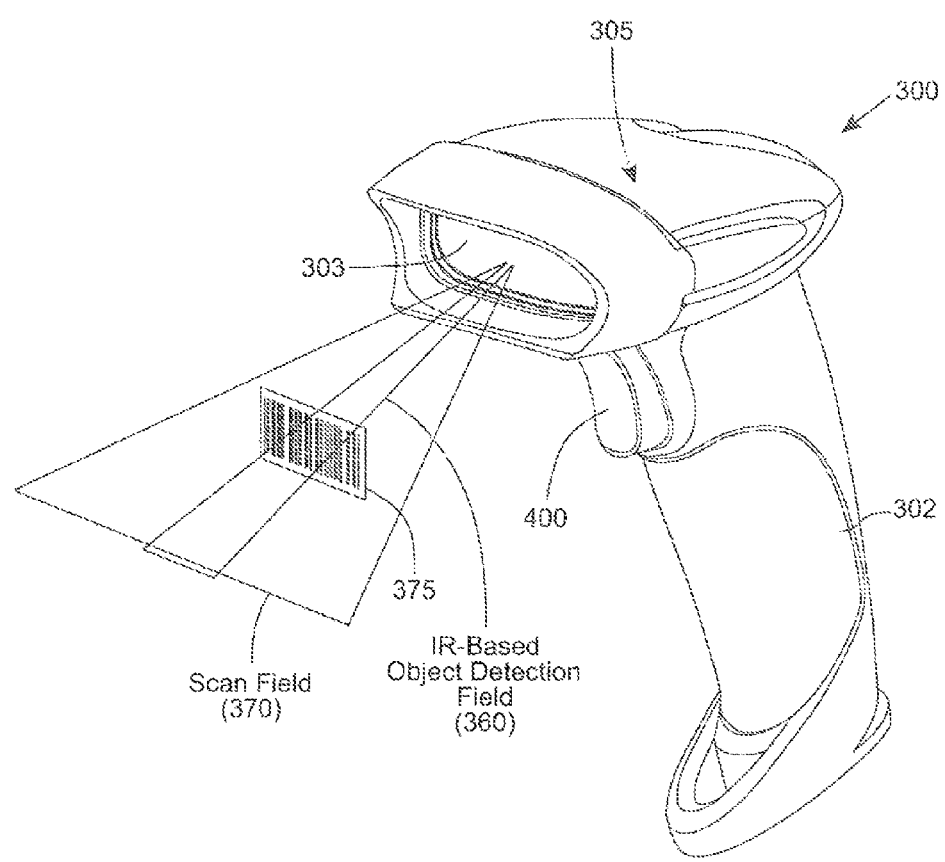
FIG. 6 is a perspective view of an illustrative embodiment of a hand-supportable laser scanning bar code symbol reading system, using a beam-waist extended red laser beam for scanning coded objects located within the full-field portion of its laser scanning field, and an blue laser beam for scanning coded objects located within the limited-field portion of its laser scanning field.
Figure 7:
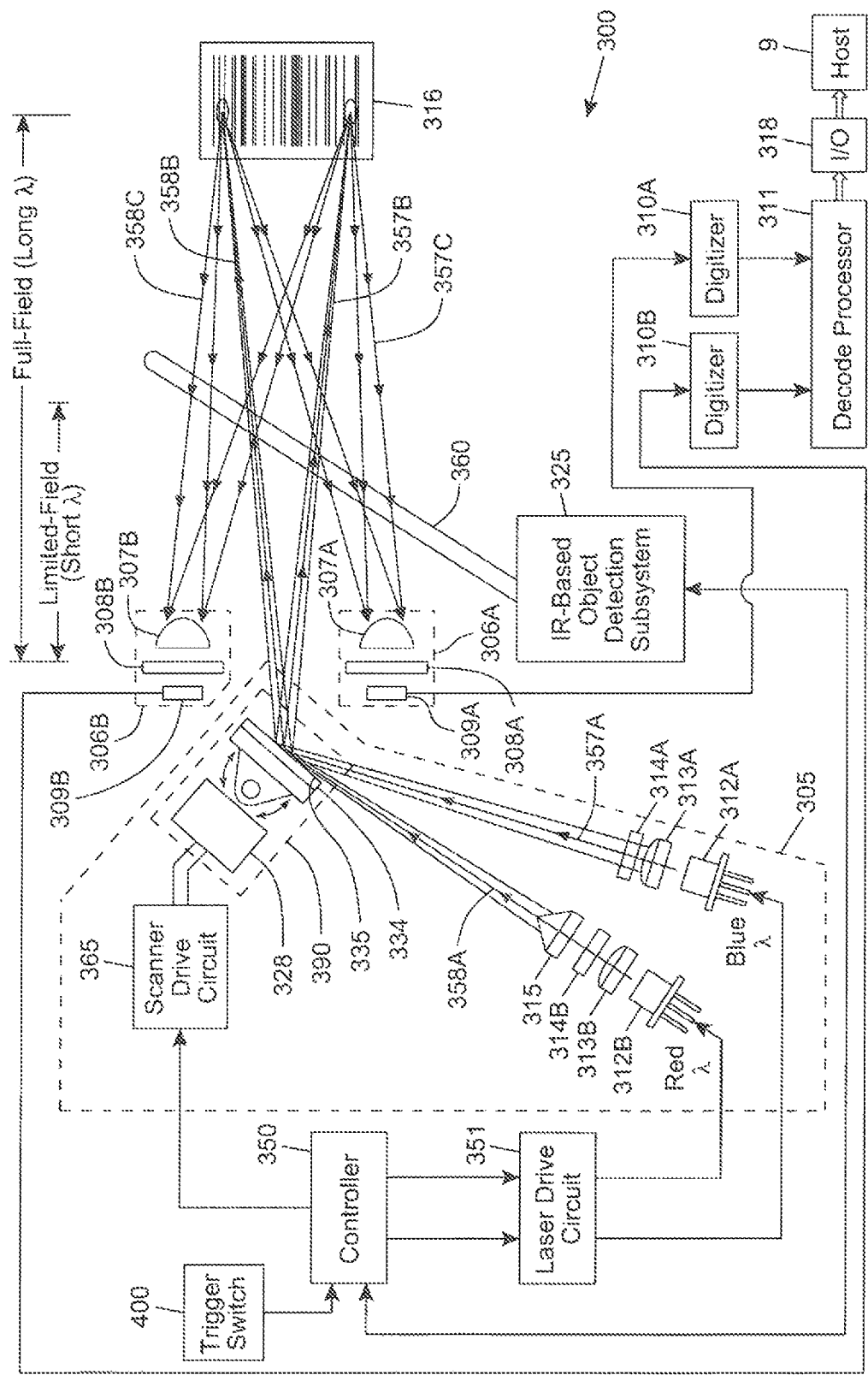
FIG. 7 is a schematic block diagram describing the major system components of the laser scanning bar code symbol reading system illustrated in FIG. 6.

As shown in FIGS. 6 and 7, the laser scanning bar code symbol reader 300 comprises: a hand-supportable housing 302 having a head portion and a handle portion supporting the head portion, and a manually-actuated trigger switch 400 integrated with the handle portion of the housing; a light transmission window 303 integrated with the head portion of the housing 302; a limited-field/full-field IR-based object detection subsystem 325 disposed in with the head portion of the housing, for generating an IR beam 360 within the laser scanning field, as shown in FIGS. 6 and 7, for automatically detecting whether or not an object is present in limited-field or full-field portions of the laser scanning field, and then automatically activating (i.e. triggering) the system including laser scanning module 390 and repeatedly scanning a visible laser beam (i.e. projecting a laser scanning plane) across the limited-field or full-field region of the scanning field, as the case may be, and reading bar code symbols on objects present therein. In the illustrative embodiment shown in FIG. 7, the laser scanning plane has a full-field region, and a limited-field region within the scanning field.

As shown in FIG. 7, the laser scanning module 390 comprises: an electromagnetic coil 328 and rotatable or oscillating scanning element 334 supporting a lightweight reflective element 335; and a coil drive circuit 365 for generating an electrical drive signal to drive the electromagnetic coil 328 in the laser scanning assembly 390.

As shown in FIG. 7, the laser scanning bar code symbol reader 300 further comprises: a blue laser source 312A for generating a blue laser beam (i.e. laser beam having a short characteristic wavelength in the blue spectral range) having a beam waist extending over the limited-field region of the laser scanning plane generated by the blue laser beam (e.g. capable of scanning 5 mil. bar code symbols over this limited range); a collimating lens 313A for collimating light rays produced from source 312A; an aperture stop 314A with a biaxial aperture for shaping the cross-sectional dimensions of the collimated laser beam from blue laser source 312A; a red laser source 312B for generating a red laser beam (i.e. laser beam having a long characteristic wavelength in the red spectral range) having a beam waist extending over the full-field region of the laser scanning plane generated by the red laser beam (e.g. capable of scanning UPC symbols from 1-15"); a collimating lens 313B for collimating light rays produced from source 312B; an aperture stop 314B with a biaxial aperture for shaping the cross-sectional dimensions of the collimated laser beam from red laser source 312B; and beam-waist extending optics 315 for controllably extending the beam waist of the red laser beam over the full-field region of the laser scanning plane generated by the red laser beam, wherein the beam-waist extending optics 315A can be realized using a cubic phase mask (e.g. U.S. Pat. No. 6,969,003), a phase modulation plate or phase filter (e.g. U.S. Pat. No. 7,569,981), an axicon lens or a rotationally symmetric prism (e.g. U.S. Pat. No. 5,080,456), a multi-focal lens (U.S. Pat. No. 7,554,750), an axicon lens (e.g. U.S. Pat. No. 5,331,143), a Mathieu or Mathieu-Gaussian filter (U.S. Pat. No. 6,719, 204), an asymmetrical optical element (e.g. U.S. Pat. No. 7,063,261 or 7,224,538), an optical assembly using an apodization element and a negative bi-prism (e.g. copending U.S. application Ser. No. 13/233,332), a conical lens, or other functionally equivalent device, incorporated herein by reference.

As shown in FIG. 7, the laser scanning bar code symbol reader 300 further comprises: a blue light collection and detection module 306A having a light collecting lens 307A for collecting blue light 357C reflected/scattered from scanned object in the scanning field; a narrow-band blue light transmission filter 308A for transmitting only the spectral components generated by blue laser source 312A and scattered off the code symbol 316 in the scanning field; a first photo-detector 309A for detecting the intensity of collected blue laser light and generating an analog scan data signal corresponding to the detected light intensity during scanning operations; a first digitizer 310A for digitizing analog scan data signals produced from photo-detector 309A, and producing corresponding digital scan signals (i.e. digital count values); a red light collection and detection module 306B having a light collecting lens 307B for collecting red light 358C reflected/scattered from scanned object in the scanning field; a narrow-band red light transmission filter 308B for transmitting only the spectral components generated by red laser source 312B and scattered off the code symbol 316 in the scanning field; a first photo-detector 309B for detecting the intensity of collected red laser light and generating an analog scan data signal corresponding to the detected light intensity during scanning operations; a second digitizer 310B for digitizing analog scan data signals produced from photo-detector 309B, and producing corresponding digital scan signals (i.e. digital count values); and a scan data processing subsystem (i.e. decode processor) 311 for decode processing digitized data signals from modules 310A and 310B, and generating symbol character data representative of each bar code symbol scanned by the spatially-overlapping spectrally-different laser scanning beams 357B and 358B, swept across the scanning field by the scanning mirror 335.

In the illustrative embodiment, the narrow-band blue light transmission filter 308A will be tuned to a very narrow band of wavelengths centered about the characteristic wavelength of the blue laser beam generated by laser beam source (i.e. VLD) 312A, whereas the narrow-band red light transmission filter 308B will be tuned to a very narrow band of wavelengths centered about the characteristic wavelength of the red laser beam generated by laser beam source (i.e. VLD) 312B. Narrow-band optical filter 308A can be integrated with light collection lens or optical element 307A, and narrow-band optical filter 308B can be integrated with light collection lens or optical element 307B, in a manner well know in the art. Also, photo-detector 309A can be integrated with optical elements 307A and 308A to produce an ultra-compact module 306A, and photo-detector 309B can be integrated with optical elements 307B and 308B to produce an ultra-compact module 306B. Both such modules 306A and 306B can be mounted on a PC board, along with the scanning assembly 305, laser drive circuit 351, scanner drive circuit 365, and other components specified in the system block diagram shown in FIG. 7, and the PC board can be mounted within the head portion of the hand-supportable housing of the system 300, behind the light transmission window 303, in a manner known in the art.

In another embodiment, IR-based object detection subsystem 325 is mounted in the front of the light transmission window, on the PC board described above, so that the IR light transmitter and IR light receiver of the subsystem have an unobstructed view of an object within the laser scanning field of the system. Also, IR object presence detection module 325 can transmit IR signals having a continuous low-intensity output level, or having pulsed higher-intensity output level which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

At least two possible modes of operation are possible using the non-retro-reflective laser scanning system of FIG. 6.

In first manual mode of operation, red and blue laser beams 357A and 358A are simultaneously, or alternatively, generated and directed towards the oscillating scanning mirror 335 in response to a trigger event manually generated by the operator depressing the manual trigger switch 400. In turn, the scanning mirror 335 sweeps redirected laser beams 357A and 358B across the scanning field 370 to generate a single-line laser scanning pattern comprising blue and red spectral components, for scanning a bar code symbol 375 on an object that is present in the scanning field.

In second automatic mode of operation, the red laser beam 357A and blue laser beam 358A are simultaneously, or alternatively, generated and directed towards scanning mirror 335 in response to a trigger event automatically generated from the IR-based near/far object detection subsystem 325, at any instant in time. In turn, the scanning mirror sweeps either redirected laser beam 357B or 358B across the scanning field 370 to generate a single-line laser scanning pattern comprising red and blue spectral components, for scanning a bar code symbol 375 on an object that is present in the detected region of the scanning field.

When operated in the first manual mode of operation, specified in FIGS. 6 and 7, manually actuation of trigger switch 400 by the operator results in the system controller 350 generating control signals that causes the laser scanning module 305 to simultaneously, or alternatively, generate and project laser scanning beams 357B and 358B through the light transmission window 303, and scanned across the laser scanning field 370 for scanning a bar code symbol 375 on an object in the scanning field, regardless of the location of the object in the laser scanning field during this mode of system operation. Then, light collection optics 307A and 307B collects blue and red light, respectively, reflected/scattered from scanned code symbols on the object in the scanning field, and the photo-detectors 309A and 309B automatically detects the intensity of collected blue and red light (i.e. photonic energy), respectively, and generate an analog scan data signals corresponding to the light intensity detected during scanning operations. The analog scan data signal processor/digitizers 310A and 310B process the analog scan data signals and convert the processed analog scan data signals into digitized data signals. The programmed decode processor 311 decode processes digitized data signals, and generates symbol character data representative of each scanned bar code symbol decoded by the decode processor 311. Symbol character data corresponding to the bar codes read by the decoder 311 is then transmitted to the host system 9 via the I/O communication interface 318 which may support either a wired and/or wireless communication link, well known in the art. During object detection and laser scanning operations, the system controller 350 generates the necessary control signals for controlling operations within the hand-supportable laser scanning bar code symbol reading system 300.

When operated in the second automatic mode of operation, specified in FIGS. 6 and 7, IR-based object presence detection subsystem 325 automatically generates a trigger event signal when an object is detected in the limited-portion or full-portion of the laser scanning field 370. If an object is detected in the limited-field portion of the scanning field, then the system controller 350 generates a control signal that causes the laser scanning module 305 to simultaneously, or alternatively, generate and project laser scanning beams 357B and 358B through the light transmission window 303, and scanned across the laser scanning field 370 for scanning a bar code symbol 375 on an object in the scanning field, regardless of the location of the object in the laser scanning field during this mode of system operation. Then, light collection optics 307A or 307B collects light reflected/scattered from scanned code symbols on the object in the scanning field, and the photo-detector 309A or 309B automatically detects the intensity of collected blue and red light (i.e. photonic energy) and generates an analog scan data signal corresponding to the light intensity detected during scanning operations. The analog scan data signal processor/digitizers 310A and 310B process the analog scan data signals and convert the processed analog scan data signals into digitized data signals. The programmed decode processor 311 decode processes digitized data signals, and generates symbol character data representative of each scanned bar code symbol read by the decode processor 311. Symbol character data corresponding to the bar codes read by the decoder 311, are then transmitted to the host system 9 via the I/O communication interface 318 which may support either a wired and/or wireless communication link, well known in the art. During object detection and laser scanning operations, the system controller 350 generates the necessary control signals for controlling operations within the hand-supportable laser scanning bar code symbol reading system 300.

Control Operations within the Second Illustrative Embodiment of the Laser Scanning System of the Present Disclosure Referring to FIG. 8, the method of reading bar code symbols and controlling operations within the bar code reader 300 will be described in greater detail below, when operated in either its manual or automatic mode of operation. It is understood, however, that the control process described in this flow chart can be practiced in non-hand-held systems, including but not limited to POS-based systems as shown in FIGS. 1 through 2D.

Figure 8:
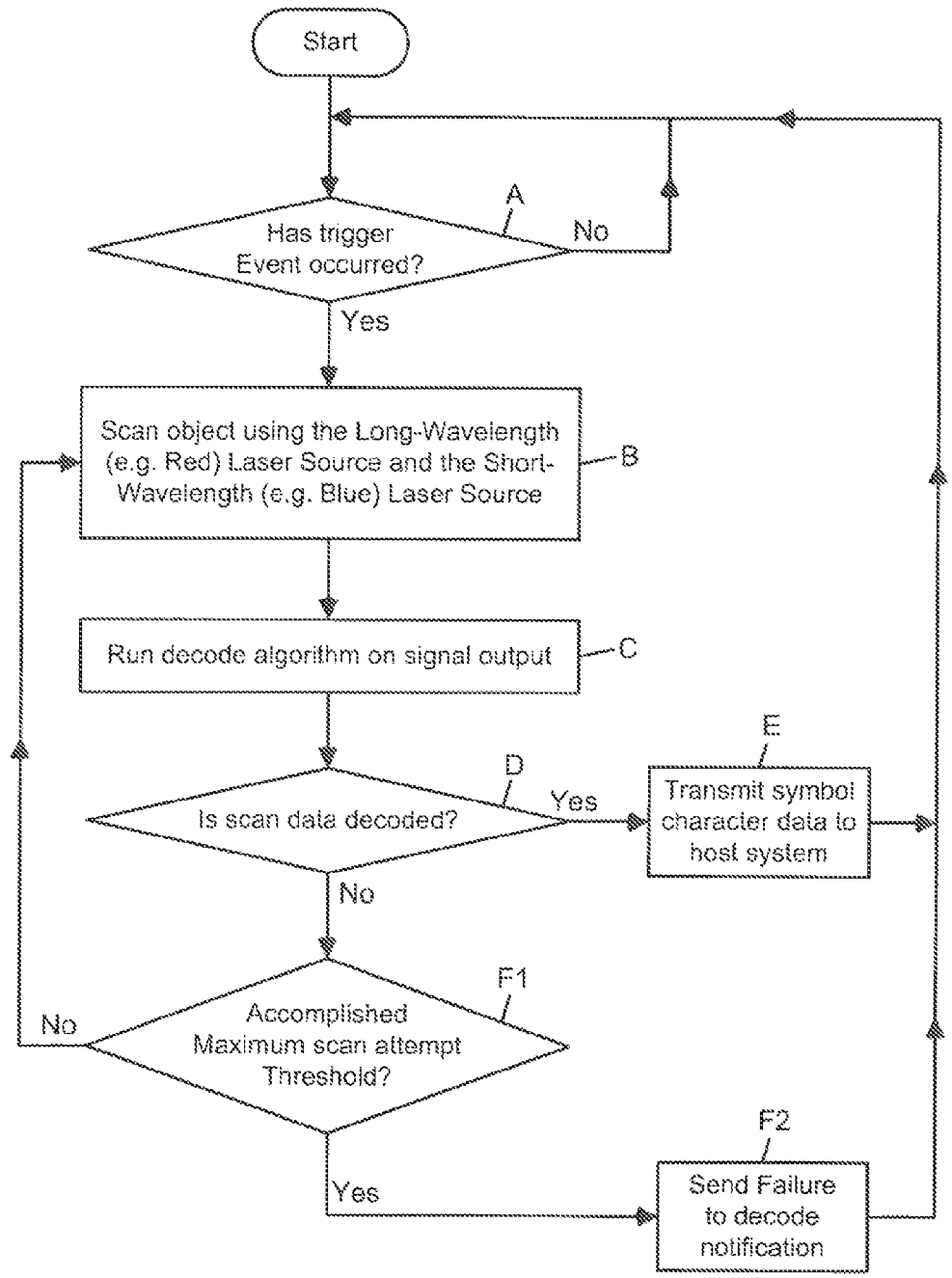
FIG. 8 is a flow chart describing the primary steps carried out in the laser scanning bar code symbol reading system of FIG. 6, during operation.

As indicated in FIG. 8, the process orchestrated by system controller 350 begins at the START Block, where all system components are activated. As indicated at Block A in FIG. 8, the system controller continues to determine when the trigger switch 400 has been depressed, generating a trigger event. When this event occurs, at Block B, the system controller directs the laser scanning module 305 to scan the object with a laser beam generated using both of the limited-field (i.e. blue) laser source 312A and full-field (i.e. red) laser source 312B.

At Block C, the decode processor 311 runs a decode algorithm on the captured scan data, and if at Block D, a bar code symbol is decoded, then at Block E, the produced symbol character data is transmitted to the host system 9, and the system controller returns to Block A. If, however, at Block D a bar code symbol is not decoded, then the system controller 350 determines at Block F1 whether or not the maximum scan attempt threshold has been reached, and if not, then the system controller 350 returns to Block B, and resumes the flow as indicated. However, if at Block F1, the system controller 350 determines that the maximum scan attempt threshold has been accomplished, then optionally, the system controller 350 proceeds to Block F2 and sends a Failure to Decode notification to the operator and returns to Block A.

The above method of reading bar code symbols and controlling system operations is carried out in an automated manner within the laser scanning bar code symbol reader 300, wholly transparent to the operator who may be holding the system in his or her hand, or the system is supported in a stand on a countertop surface.

MODIFICATIONS THAT COME TO MIND

The illustrative embodiment described above shows how the blue/red wavelength DOF-extended laser scanning beams can be used in a bi-optical laser scanning POS-based self-checkout system. It is understood, however, that such techniques can be practiced in other types of laser scanning system with excellent results.

While the retro-reflective type laser scanning station 100A, 100B disclosed herein has been deployed in a bioptical-type laser scanning system 1, it is understood that this retro-reflective type laser scanning station can be embodied in any hand-supportable bar code reader, desktop or counter-top bar code symbol reader, mobile bar code symbol reading system, or fixed-mount system application.

While aperture stops and optical filters in the illustrative embodiments have been shown in specific configurations, it is understood that these optical components can be arranged in other optical configurations with functionally equivalent results.

Also, in the disclosed illustrative embodiments, red light wavelengths have been used to illuminate objects in the full portion of the scanning field, while blue light wavelengths have been used to illuminate objects in the limited portion of the scanning field, it is understood that in alternative embodiments, red light wavelengths have been used to illuminate objects in the limited portion of the scanning field, while blue light wavelengths have been used to illuminate objects in the full portion of the scanning field.

Also, there may be circumstance when it may be desirable to also place a beam forming element in the blue laser path 116, similar to the beam forming element 115A in the red laser path 115.

While the non-retro-reflective type laser scanning station disclosed has been deployed in a hand-supportable laser scanning system 300, it is understood that this non-retro-reflective type laser scanning stations can be embodied in any desktop or counter-top bar code symbol reader, mobile bar code symbol reading system, or fixed-mount system application.

Variations and modifications to this control process will readily occur to those skilled in the art having the benefit of the present disclosure. All such modifications and variations are deemed to be within the scope of the accompanying Claims.

What is claimed is:

1. A bar code symbol reading system comprising:
a system housing having a scanning window;
a laser scanning subsystem disposed in said system housing, generating and projecting a laser scanning plane through said scanning window and into a scanning field, scanning one or more objects within said scanning field, and producing scan data signals for decode processing;
wherein said laser scanning plane has a full-field region within said scanning field, and a limited-field region within said scanning field; and
wherein said laser scanning subsystem includes
  (i) a beam scanning mechanism for scanning first and second laser scanning beams across said laser scanning field to produce said laser scanning plane;
  (ii) a first laser source generating said first laser beam having a beam waist extending over the full-field region of said laser scanning plane generated using said first laser source and said beam scanning mechanism, and beam-waist extending optics extending the beam waist of said first laser beam over the full-field region of said laser scanning plane during scanning operations, wherein said first laser beam comprises red spectral components; and
  (iii) a second laser source generating said second laser beam having a beam waist extending over the limited-field region of said laser scanning plane generated using said second laser source and said beam scanning mechanism, wherein said second laser beam comprises blue spectral components; and
a scan data processor for processing said scan data signals produced by said laser scanning subsystem in effort to read a bar code symbol on said object passed through said scanning field and scanned by said laser scanning field, and generate symbol character data representative of said read bar code symbol; and
a system controller for controlling the operation of said laser scanning subsystem during said system operation.

2. The bar code symbol reading system of claim 1, wherein said first and second laser beams are generated and scanned simultaneously, to produce said laser scanning field.

3. The bar code symbol reading system of claim 1, wherein said first and second laser beams are generated and scanned alternatively, to produce said laser scanning field.

4. The bar code symbol reading system of claim 1, wherein said system housing is either counter-top mounted or hand-supportable.

5. The bar code symbol reading system of claim 1, wherein said first laser source further comprises beam-waist extending optics selected from the group consisting of: a cubic phase mask; a phase modulation plate; an axicon lens or a rotationally symmetric prism; a multi-focal lens; a Mathieu or Mathieu-Gaussian filter; an asymmetrical optical element; an optical assembly using an apodization element and a negative bi-prism; a conical lens; and other functionally equivalent devices.

6. The bar code symbol reading system of claim 1, wherein said second laser beam has a smaller spot size within the limited-field region than said first laser beam for reading high-density bar codes.

7. A method of operating a bar code symbol reading system comprising the steps of:
(a) providing a bar code symbol reading system, including:
a system housing having a scanning window, and a laser scanning subsystem disposed in said system housing, generating and projecting a laser scanning plane through said scanning window and into a scanning field, wherein said laser scanning plane has a full-field region within said scanning field, and a limited-field region within said scanning field; and
wherein said laser scanning subsystem includes
  (i) a beam scanning mechanism scanning one or more laser scanning beams across said laser scanning field to produce said laser scanning plane;
  (ii) a first laser source generating a first laser beam having a beam waist extending over the full-field region of said laser scanning plane generated using said first laser source and said beam scanning mechanism, and beam-waist extending optics extending the beam waist of said first laser beam over the full-field region of said laser scanning plane during scanning operations, wherein said first laser beam comprises red spectral components;
  (iii) a second laser source generating a second laser beam having a beam waist extending over the limited-field region of said laser scanning plane generated using said second laser source and said beam scanning mechanism, wherein said second laser beam comprises blue spectral components;
  (iv) a scanning element scanning said first and second laser beams so as to generate said laser scanning plane within said scanning field; and
  (v) a scan data processor for processing said scan data signals produced by said laser scanning subsystem in effort to read a bar code symbol on each object passed through said scanning field, and generate symbol character data representative of each said read bar code symbol;
(b) generating and projecting said laser scanning planes through said scanning window, and into said scanning field, for scanning one or more objects within said scanning field and producing scan data for decode processing; and
(c) processing said scan data produced by said laser scanning subsystem in effort to read a bar code symbol on said object passed through said scanning field, and generating symbol character data representative of said read bar code symbol.

8. The method of claim 7, wherein said system housing is either counter-top mounted or hand-supportable.

9. A bar code symbol reading system comprising:
a system housing having a scanning window;
a laser scanning subsystem disposed in said system housing, generating and projecting a plurality of laser scanning planes through said scanning window, which intersect within a 3D scanning volume defined adjacent said scanning window and provide a laser scanning pattern within said 3D scanning volume, scanning one or more objects within said 3D scanning volume and producing scan data for decode processing;
wherein said each said laser scanning plane has a full-field region within said 3D scanning volume, and a limited-field region within said 3D scanning volume; and
wherein said laser scanning subsystem includes
  (i) a first laser source generating a first laser beam having a first wavelength comprising red spectral components and a beam waist extending over the full-field region of each laser scanning plane generated from said first laser beam, and beam-waist extending optics extending the beam waist of said first laser beam over the full-field region of the laser scanning plane generated from said first laser beam; and
  (ii) a second laser source generating a second laser beam having a second wavelength comprising blue spectral components and a beam waist extending over the limited-field region of each laser scanning plane generated from said second laser beam;
a scan data processor for processing said scan data produced by said laser scanning subsystem in effort to read a bar code symbol on said object passed through said 3D scanning volume, and generate symbol character data representative of said read bar code symbol; and
a system controller for controlling the operation of said laser scanning subsystem during said system operation.

10. The bar code symbol reading system of claim 9, wherein said laser scanning pattern is an omni-directional laser scanning pattern within said 3D scanning volume.

11. The bar code symbol reading system of claim 9, wherein said first laser source further comprises beam-waist extending optics selected from the group consisting of: a cubic phase mask; a phase modulation plate or phase; an axicon lens or a rotationally symmetric prism; a multi-focal lens; a Mathieu or Mathieu-Gaussian filter; an asymmetrical optical element; an optical assembly using an apodization element and a negative bi-prism; a conical lens; and other functionally equivalent devices.

12. The bar code symbol reading system of claim 9, wherein said system housing is either counter-top mounted or hand-supportable.

13. The bar code symbol reading system of claim 9 realized as a bioptical laser scanning system, wherein said system housing has a horizontal housing section provided with a horizontal scanning window, and a vertical housing section provided with a vertical scanning window;
wherein one said laser scanning subsystem is installed in said horizontal scanning window to generate a first plurality of laser scanning planes through said horizontal scanning window, and one said laser scanning subsystem is installed in said vertical scanning window to generate a second plurality of laser scanning planes through said vertical scanning window;
wherein said first and second plurality of laser scanning planes intersect within a 3D scanning volume defined adjacent said horizontal and vertical scanning windows and provide a laser scanning pattern within said 3D scanning volume, for scanning one or more objects within said 3D scanning volume and producing scan data for decode processing; and
wherein said each said laser scanning plane has a full-field region within said 3D scanning volume, and a limited-field region within said 3D scanning volume.

* * * * *